Figure 1:
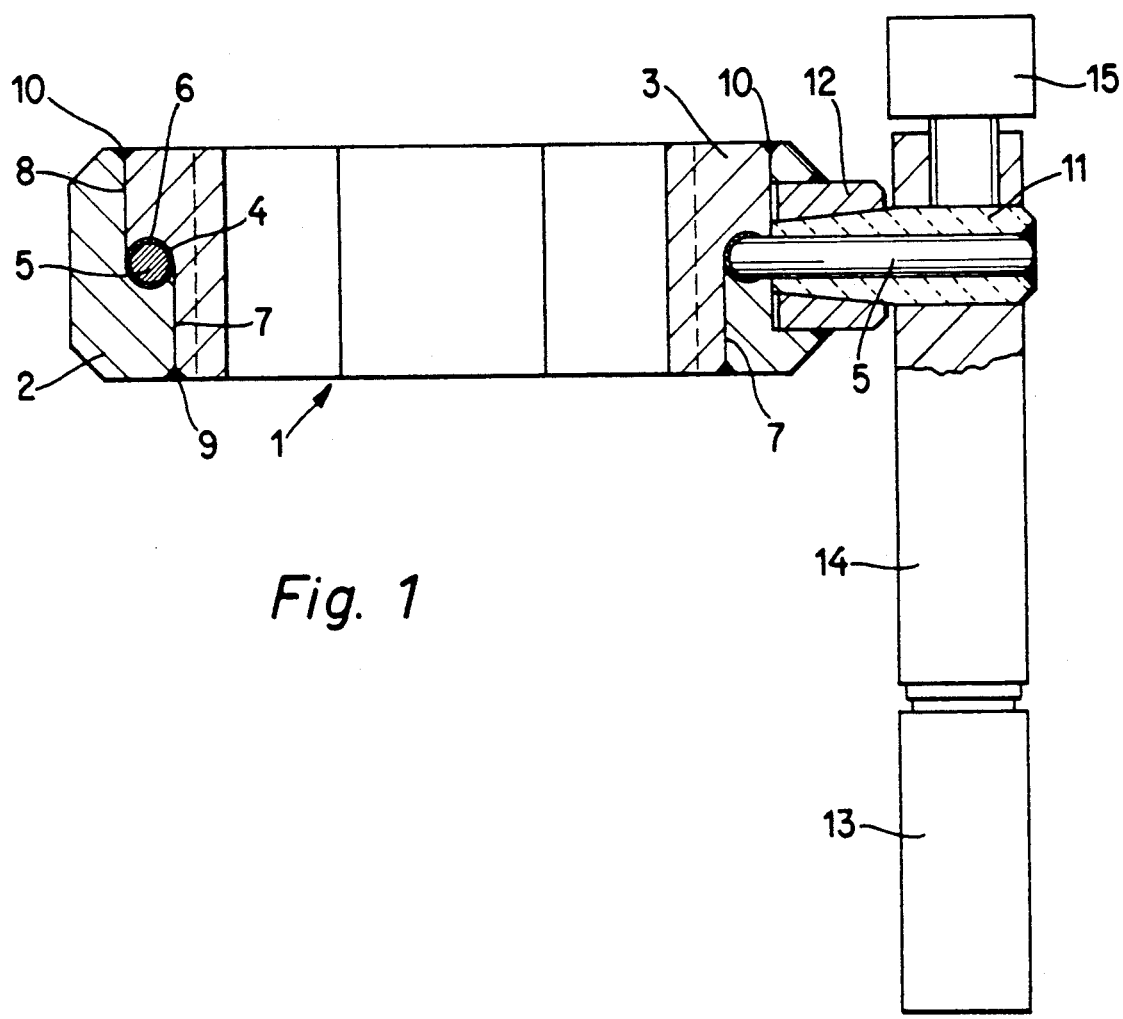

United States Patent [19]

Müller

[11] Patent Number: 5,051,563
[45] Date of Patent: Sep. 24, 1991

[54] SURFACE HEATING ELEMENT FOR COMPONENTS OF TOOLS AND MACHINES

[75] Inventor: Walter Müller, Battenberg/Eder, Fed. Rep. of Germany

[73] Assignee: EWIKON Entwicklung und Konstruktion GmbH & Co. KG., Kirchlengern, Fed. Rep. of Germany

[21] Appl. No.: 331,661

[22] PCT Filed: Jun. 23, 1988

[86] PCT No.: PCT/DE88/00376

§ 371 Date: May 17, 1989

§ 102(e) Date: May 17, 1989

[87] PCT Pub. No.: WO89/00803

PCT Pub. Date: Jan. 26, 1989

[30] Foreign Application Priority Data

Jul. 21, 1987 [DE] Fed. Rep. of Germany ....... 3724088

[51] Int. Cl.⁵ .............................................. H05B 3/58
[52] U.S. Cl. .................................... 219/535; 219/536; 219/549
[58] Field of Search ............... 219/535, 552, 553, 534, 219/536, 544, 549

[56] References Cited

U.S. PATENT DOCUMENTS

| | | | |
|---|---|---|---|
| 2,274,839 | 3/1942 | Marizk | 219/534 |
| 3,110,795 | 11/1963 | Bremer | 219/536 |
| 3,436,816 | 4/1969 | Lemelson | 219/544 |
| 3,849,630 | 11/1974 | Halliday | 219/535 |
| 4,008,845 | 2/1977 | Bleckmann | 219/536 |
| 4,386,262 | 5/1983 | Gellert | 219/535 |
| 4,574,186 | 3/1986 | Sakai et al. | 219/549 |
| 4,778,981 | 10/1988 | Rüede | 219/535 |

FOREIGN PATENT DOCUMENTS

| | | |
|---|---|---|
| 2063852 | 6/1972 | Fed. Rep. of Germany . |
| 1041108 | 10/1953 | France . |
| 2443919 | 7/1980 | France . |
| 60-193625 | 10/1985 | Japan . |

OTHER PUBLICATIONS

Patent Abstracts of Japan, Feb. 18, 1986, vol. 10, No. 40, Japan, A, 60-193,625.

*Primary Examiner*—Evans Geoffrey S.
*Attorney, Agent, or Firm*—Peter K. Kontler

[57] ABSTRACT

A device for heating components of tools and machines has another ring and an annular or tubular part which is surrounded by the outer ring. The annular or tubular part has a heatable surface and may constitute a tool or machine component or, alternatively, may be designed to be slipped onto such a component. The outer ring and the annular or tubular part cooperate to define a space and an electrical resistance heating element is received in this space with no play. The outer ring and the annular or tubular part have one or more pairs of abutting surfaces and the abutting surfaces of each pair are joined at their outer margins by a continuous weld seam. The weld seam or seams join the outer ring and the annular or tubular part to one another and provide gastight and liquidtight seals between the space containing the heating element and the atmosphere. The outer ring has a coefficient of thermal expansion less than or equal to that of the annular or tubular part.

8 Claims, 3 Drawing Sheets

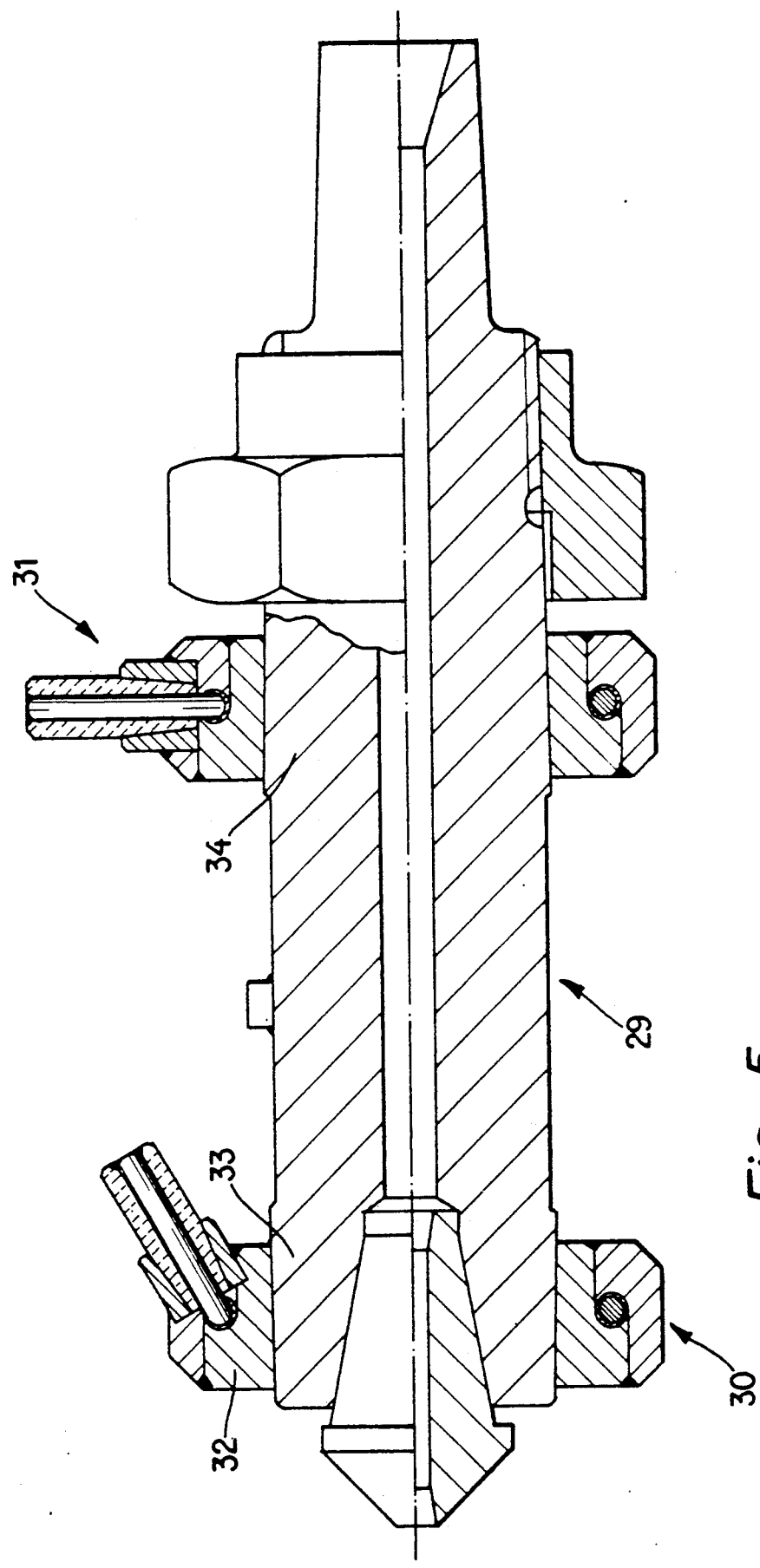

SURFACE HEATING ELEMENT FOR COMPONENTS OF TOOLS AND MACHINES

The invention relates to a surface heating element having an electrical resistance heater for components of tools and machines and including an annular outer shell, an inner part and a heat conductor or heat conductors between the inner part and the outer shell.

Surface hearing elements which largely conform to the shape of the machine component to be heated are known.

An annular, known surface heating element has a thermal insulating jacket consisting of two shell segments which are articulated to one another. The heating element is equipped with a wave-shaped reflector at its inner side and, to the outside, covers heating bands drawn onto a ring which can be placed upon the machine component to be heated.

The overall structure of this surface heating element is very expensive and its life is short since the heated bands can come into contact with the oxygen in the air. This causes scaling which, in turn, results in wear of the heating bands.

It is an object of the invention to design a surface heating element of the above type in such a manner that the heat conductor is arranged in the heating element so as to be largely free of wear and attrition, and that the heating element achieves a high thermal output together with long life and can be easily adjusted to the tool and machine components to be heated.

According to the invention, this object is achieved in that each heat conductor, which is enclosed in a thin insulating layer, is arranged without play in a receptacle defined by two parts of the heating element and sealed so as to be gastight and liquidtight relative to the atmosphere.

In accordance with an embodiment of the invention, the receptacle for the heat conductor is defined by the outer shell and the inner part. This results in a surface heating element with small dimensions. In order that the heat conductor, which lies in the receptacle without play, remains firmly clamped between the outer shell and the inner part during operation also, a metal having an expansion coefficient less than or equal to the expansion coefficient of the inner part is selected for the outer shell.

The outer shell and the inner part can define a plurality of neighboring receptacles for the heat conductors. It is also possible to provide one or more annular intermediate parts between the outer shell and the inner part so that one or more neighboring receptacles for heat conductors are defined by the outer shell and the adjacent annular intermediate part and/or by two annular intermediate parts and/or by an annular intermediate part and the inner part.

The gastight and liquidtight sealing of the receptacles for the heat conductors with respect to the atmosphere can be achieved by welding the adjoining surfaces of the parts defining the receptacle externally of the heating element.

By firmly clamping the heat conductors in the receptacles defined by the parts of the heating element and preventing the penetration of atmospheric oxygen, in particular, into the receptacles, mechanical wear of the heat conductors and attrition due to corrosion are held to small amounts.

Figure 2:
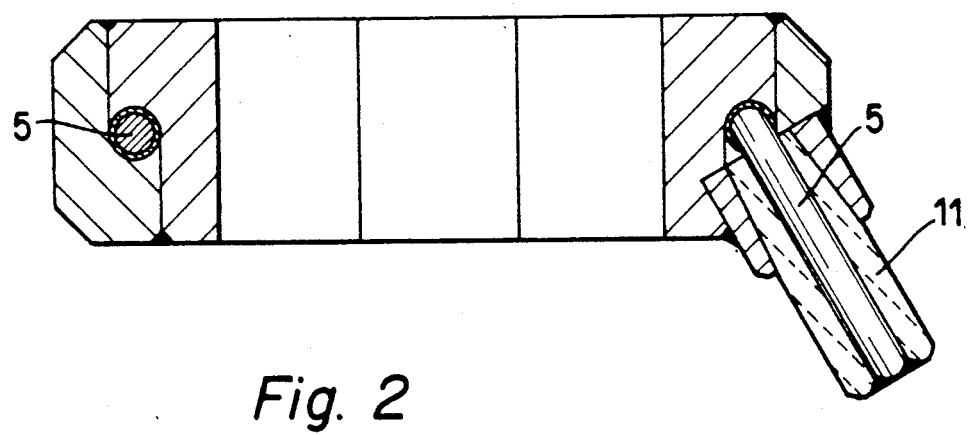
Figure 3:
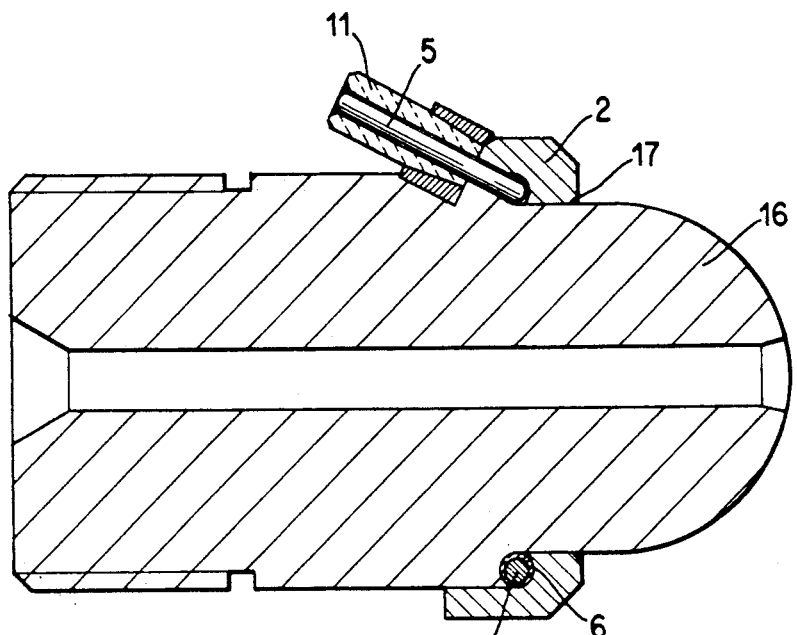
Figure 4:
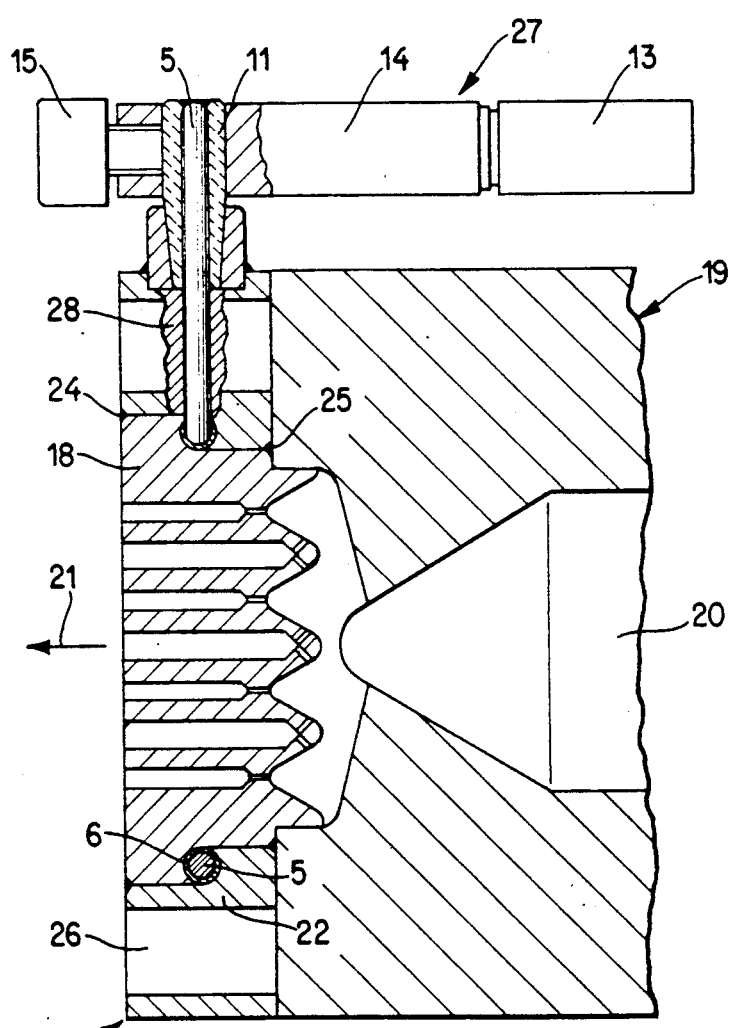

Exemplary embodiments of the invention are illustrated in the drawings and are described below. There is shown:

FIG. 1 a partly sectional view of an annular surface heating element with a current connection extending parallel to the longitudinal axis of the heating element, FIG. 2 a sectional view of a heating element as in FIG. 1 with an inclined current connection, FIG. 3 a sectional view of a machine nozzle with a heating element positioned on the same, FIG. 4 a fragmentary sectional elevational view of an injection molding machine for plastic with a heated sieve carrier, and FIG. 5 a partly sectional view of a nozzle of a zinc pressure casting machine with two surface heating elements.

The surface heating element 1 of FIG. 1 consists of an outer shell 2 and an annular inner part 3 which, by virtue of a stepped construction, interlock in a complementary fashion and define a receptacle 4 of circular cross section for a heat conductor 5 enclosed in an electrically insulating layer 6 which can be made of ceramic and has a thickness of 0.1 to 0.5 mm. The heat conductor 5 is disposed in the receiving channel without play together with this insulating layer.

Weld seams 9, 10 are provided in the outer region of the adjoining surfaces 7 and 8 and seal the receptacle 4 for the heat conductor 5 so as to be liquidtight and gastight relative to the atmosphere. The heat conductor 5 is extended out at a location of the heating element where it is enclosed by an insulating sleeve 11 inserted in a bushing 12 which, in turn, is welded to the outer shell and the inner part.

The current connection consists of a plug socket 13 and an intermediate connection part 14 which is fixed to the sleeve 11 by means of a clamping screw 15.

In operation, the heat conductor 5, as well as the outer shell 2 and the inner part 3, can be heated to red heat. The inner part 3 is previously placed on the machine component to be heated.

The embodiment of FIG. 2 differs from that of FIG. 1 only in the inclined current connection.

The end of the heat conductor remote from the current connection can be extended out of the heating element and provided with an electrical junction to form the circuit or it can be welded to the outer shell or the inner ring so that the current supply must go via ground.

For adjustment to the machine component to be heated, the annular inner part 3 can be machined in order to increase the inner diameter.

The inner part can also be made disc-shaped so that the heating element can be screwed flat to locations of a tool or machine which are to be heated.

In the exemplary embodiment of FIG. 3, the inner part of the heating element is a functional part of the machine. The nozzle 16 of an injection molding machine constitutes the inner part of the heating element with the outer shell 2 being fixed to the nozzle, e.g., by means of a weld seam 17. The heat conductor with the insulating layer is clamped without play in the receptacle of circular cross section formed by the outer shell 2 and the machine nozzle 16 for the heat conductor 5 and the insulating layer 6 enclosing the heat conductor.

In the exemplary embodiment of FIG. 4, the inner part of the surface heating element is constituted by a sieve carrier 18 which, in an injection molding machine 19 for plastic, is supplied with the plasticized plastic granulate by means of a non-illustrated screw spindle via a channel 20. The plastic mass leaving the sieve carrier is conveyed to the nozzle of the machine in the direction of the arrow 21.

As in the other exemplary embodiments, the sieve carrier 18 which, together with the outer shell 22, forms the heating element 23 defines with the outer shell the receiving channel for the heat conductor 5 and the insulating layer 6 enclosing the heat conductor. The outer shell and the sieve carrier are connected to one another by weld seams 24, 25.

The outer shell 22 has a ring of through holes 26 for fastening screws which fix the heating element to the machine. The heat conductor 5 is passed to the current connection 27 between two neighboring through holes of this ring and, in this region, extends through a sleeve 28 of electrically insulating material.

In the exemplary embodiment of FIG. 5, the nozzle 29 of a zinc pressure casting machine is shown partly in section and is equipped with two surface heating elements 30 and 31. The inner ring 32 of the heating element 30 is provided with a conical bore and is positioned on the conical front end 33 of the machine nozzle. The heating element 31 circumscribes a cylindrical portion 34 of the machine nozzle.

This exemplary embodiment illustrates the simple adjustability of the inner rings of the heating elements to the machine nozzle since the inner rings can be machined.

In the illustrated exemplary embodiment, the surface heating elements 30 and 31 have the additional function of mechanically reinforcing the machine nozzle so that loading forces can be carried away from the machine nozzle by these heating elements.

Reference Characters

1 Surface Heating Element
2 Outer Shell
3 Inner Part
4 Receptacle
5 Heat Conductor
6 Insulating Layer
7 Adjoining Surface
8 Adjoining Surface
9 Weld Seam
10 Weld Seam
11 Insulating Sleeve
12 Bushing
13 Plug Socket
14 Intermediate Connection part
15 Clamping Screw
16 Machine Nozzle
17 Weld Seam
18 Sieve Carrier
19 Injection Molding Machine for Plastic
20 Channel
21 Arrow
22 Outer Shell
23 Heating Element
24 Weld Seam
25 Weld Seam
26 Through Hole
27 Current Connection
28 Sleeve
29 Machine Nozzle
30 Surface Heating Element
31 Surface Heating Element
32 Inner Ring
33 Front End
34 Cylindrical Portion

I claim:

1. A surface heating device for external mounting on parts of machines and tools, comprising a first substantially ring-shaped member; a second substantially ring-shaped member surrounding said first member and defining therewith a single annular space disposed in a single plane, each of said members defining substantially one-half of said space; a single ring-shaped electric resistance heat radiating element in said space; an electrically insulating element surrounding said heat radiating element in said space, said elements completely filling and being fixedly held in said space and said members having abutting stepped surfaces which gas- and liquid-tightly seal said space from the atmosphere, said heat radiating element having a portion extending from said space; and means for gas- and liquid-tightly sealing said portion of said space from the atmosphere around said portion of said heat radiating element.

2. The heating device of claim 1, wherein said first member is disc-shaped.

3. The heating device of claim 1, wherein said first member constitutes a tool or machine component.

4. The device of claim 1, wherein said second member has a coefficient of thermal expansion less than or equal to that of said first member.

5. The heating device of claim 1, wherein said abutting surfaces have outer marginal portions; and further comprising a weld at said outer marginal portions joining said members to one another.

6. The heating device of claim 5, wherein said weld is substantially continuous along said outer marginal portions.

7. The heating device of claim 1, wherein said second member has at least one opening for a fastening element.

8. The heating device of claim 7, wherein said second member is provided with a multiplicity of openings for respective fastening elements, said openings being arranged in a ring.

* * * * *